Nov. 21, 1967 J. L. RENNICK 3,354,336

RING MAGNETIZED ACROSS THICKNESS WITH TWO DIAMETRICALLY OPPOSED AND OPPOSITELY ORIENTED GROUPS OF MAGNETIC POLE PAIRS

Filed June 30, 1965 2 Sheets-Sheet 1

INVENTOR.

John L. Rennick

By [signature]

Attorney

Nov. 21, 1967 J. L. RENNICK 3,354,336

RING MAGNETIZED ACROSS THICKNESS WITH TWO DIAMETRICALLY OPPOSED AND OPPOSITELY ORIENTED GROUPS OF MAGNETIC POLE PAIRS

Filed June 30, 1965 2 Sheets-Sheet 2

INVENTOR.
John L. Rennick
BY Cornelius J. O'Connor
Attorney

United States Patent Office
3,354,336
Patented Nov. 21, 1967

3,354,336

RING MAGNETIZED ACROSS THICKNESS WITH TWO DIAMETRICALLY OPPOSED AND OPPOSITELY ORIENTED GROUPS OF MAGNETIC POLE PAIRS

John L. Rennick, Elmwood Park, Ill., assignor to Zenith Radio Corporation, Chicago, Ill., a corporation of Delaware Filed June 30, 1965, Ser. No. 468,254
6 Claims. (Cl. 313—77)

ABSTRACT OF THE DISCLOSURE

A correction device for deflecting the beams of a color television cathode-ray tube in a common direction to attain color purity includes a pair of annular members each formed of a magnetizable material magnetized across its thickness dimension to establish, on each member, two groups of magnetic pole pairs. A support element of non-magnetic material is mounted on the neck section of the tube and rotatably supports the annular members in a plane normal to the central axis of the tube and with magnetic axes of all the pole pairs disposed substantially parallel to that axis. On each member the pole pairs of one group are oriented oppositely to the pole pairs of the other group so as to develop a composite magnetic field having opposing paraxial components at the central axis of the tube and aiding transverse beam deflection field components within the neck section of the tube at a point spaced from the plane of the member.

This invention relates in general to color television receivers and in particular to a color purity correction device for a color reproducing multi-beam cathode-ray tube. The multi-beam tube currently employed in color television receivers comprises a gun arrangement for generating and projecting three electron beams toward a mosaic type fluorescent screen formed of a myriad of phosphor triads. Each triad, in turn, comprises a red, a green and a blue phosphor dot each of which emits a characteristic hue when excited by its assigned electron beam. Disposed immediately adjacent the screen is an aperture mask comprising a like myriad of apertures in registration with the color triads. Initially, this shadow mask serves as a template in forming the screen; thereafter it is mounted within the tube envelope between the beam source and the screen where it functions as a color selector. In this role it "masks" the red and green phosphor dots from the blue beam, the red and blue dots from the green beam and the blue and green dots from the red beam.

In the ideal situation the three electron beams always converge in the plane of the aperture mask and impinge upon only their assigned phosphor dots. However, due to the influence of the earth's magnetic field, as well as to extraneous magnetic fields emanating from circuit apparatus, the beams are laterally displaced from their intended paths. As a result the electron beams have access to color dots other than their assigned target areas and color impurity is introduced. Accordingly, corrective measures must be taken to compensate for the effects of such fields.

A number of schemes have been employed in the past to achieve color purity, one of the most common contemplates the use of a pair of metal rings which are magnetized across their diameters and rotatably mounted upon the neck of the cathode ray tube. Beam repositioning is achieved by rotating the magnets, relative to one another, to establish a compensating magnetic field perpendicular to the beam paths and having the requisite strength and orientation.

The location of the magnets upon the neck of the tube is important since their resultant field will adversely influence the convergence apparatus if they are positioned too far forward. Still another consideration governing the location of the magnet rings is the physically available space which, in the new short-neck wide-deflection angle color tubes, is at a premium. These considerations practically dictate placement of the magnets substantially over the cathodes of the electron gun structure. While diametrically magnetized rings do achieve acceptable purity correction, when such magnets are mounted over the cathode elements the transverse components of the field, being concentrated in the plane of the ring, tend to defocus the beams. This obtains because the beam is soft and readily dispersed at this stage of its development.

Of equal significance in the matter of purity correction is the mounting structure for adjustably supporting the correction magnets. Prior art structures have invariably constituted cumbersome and expensive arrangements. Particularly is this the case in structures which combine ancillary apparatus such as a blue lateral convergence control.

It is therefore an object of the invention to provide an improved electron beam control apparatus.

It is a more specific object of the invention to provide a novel color purity correction device.

It is a further object of the invention to provide an improved mounting structure for supporting color purity correction magnets.

It is a general object of the invention to provide means for economically and conveniently controlling the trajectories of the electron beam group of a multi-beam color cathode ray tube.

The invention contemplates a color purity correction device for use in conjunction with a color television cathode ray tube of the type having a fluorescent screen comprising a plurality of interspersed similar groups of similar elemental areas, each of which groups comprises a different electron beam responsive phosphor. The tube further includes a neck section containing means for projecting a corresponding plurality of electron beam components emanating from effective points of origin which are symmetrically displaced from the central axis of the tube. In accordance with the invention a purity correction device for such a tube comprises a support element of non-magnetic material which is mounted on the neck section of the tube in juxtaposition to the electron beam components projecting means. The correction device further comprises means, including a plurality of magnetic pole pairs, adjustably mounted on the support element with pole pairs disposed on both sides of the neck section and with their magnetic axes substantially parallel to the central axis. The pole pairs on one side of the neck section are oriented oppositely to the pole pairs on the other side of the neck section in order to develop a composite magnetic field having opposing paraxial components at the central axis and aiding transverse field components at a point remote from the opposing components which effect deflection of the electron beam components in a common direction transverse to the central axis.

The features of this invention which are believed to be novel are set forth with particularity in the appended claims. The invention, together with further objects and advantages thereof, may best be understood, however, by reference to the following description taken in conjunction with the accompanying drawings, in the several figures of which like reference numerals identify like elements, and in which:

Figures 1, 2, 3, 3A, 3B, 3C:
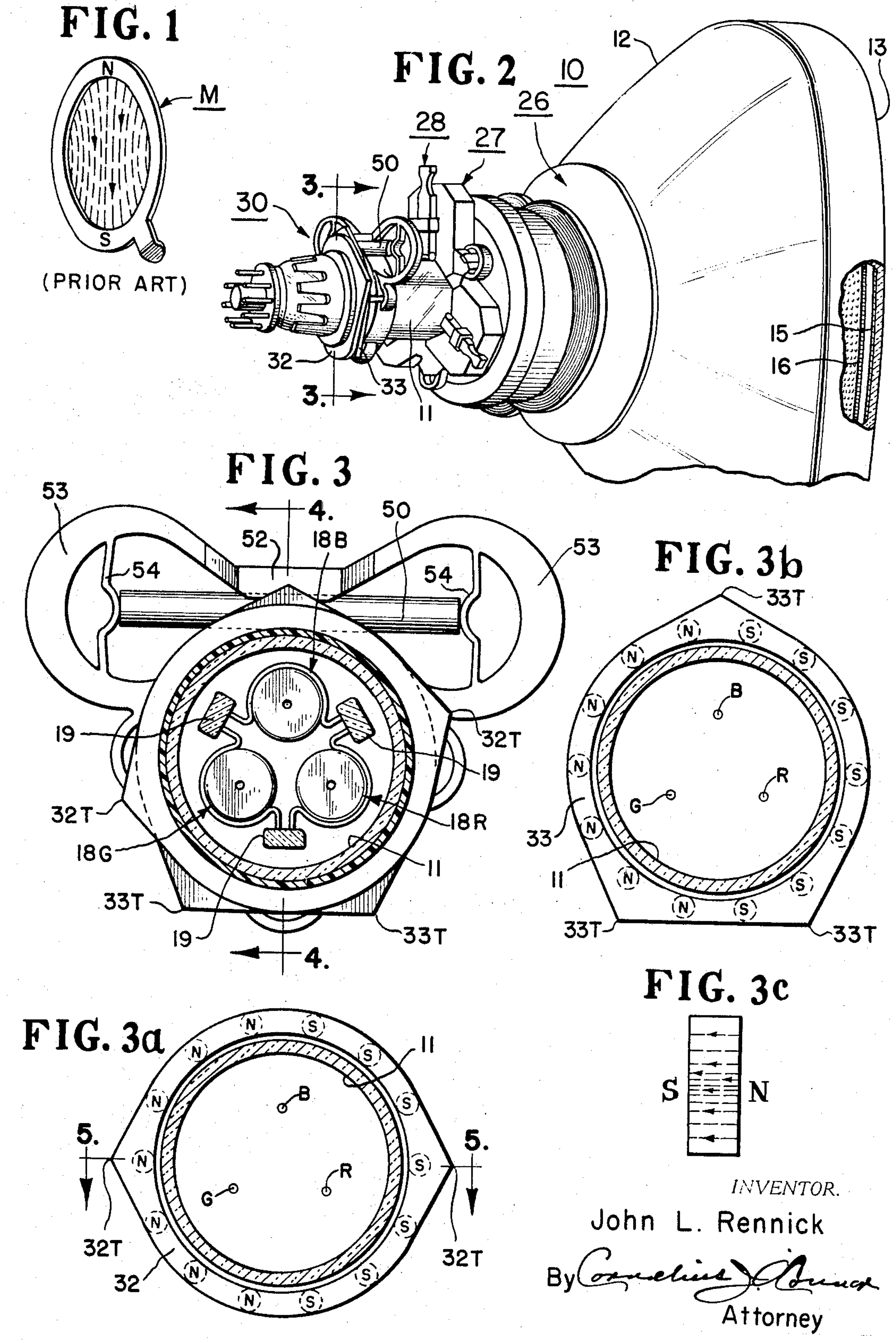
FIGURE 1 is a perspective view of a prior art color purity correction magnet.
FIGURE 2 is a perspective view of a tri-color cathode ray tube employing the subject invention.
FIGURE 3 is a sectional view taken along lines 3—3 of FIGURE 2.
Figures 4, 5, 6, 6A, 6B, 7, 8:
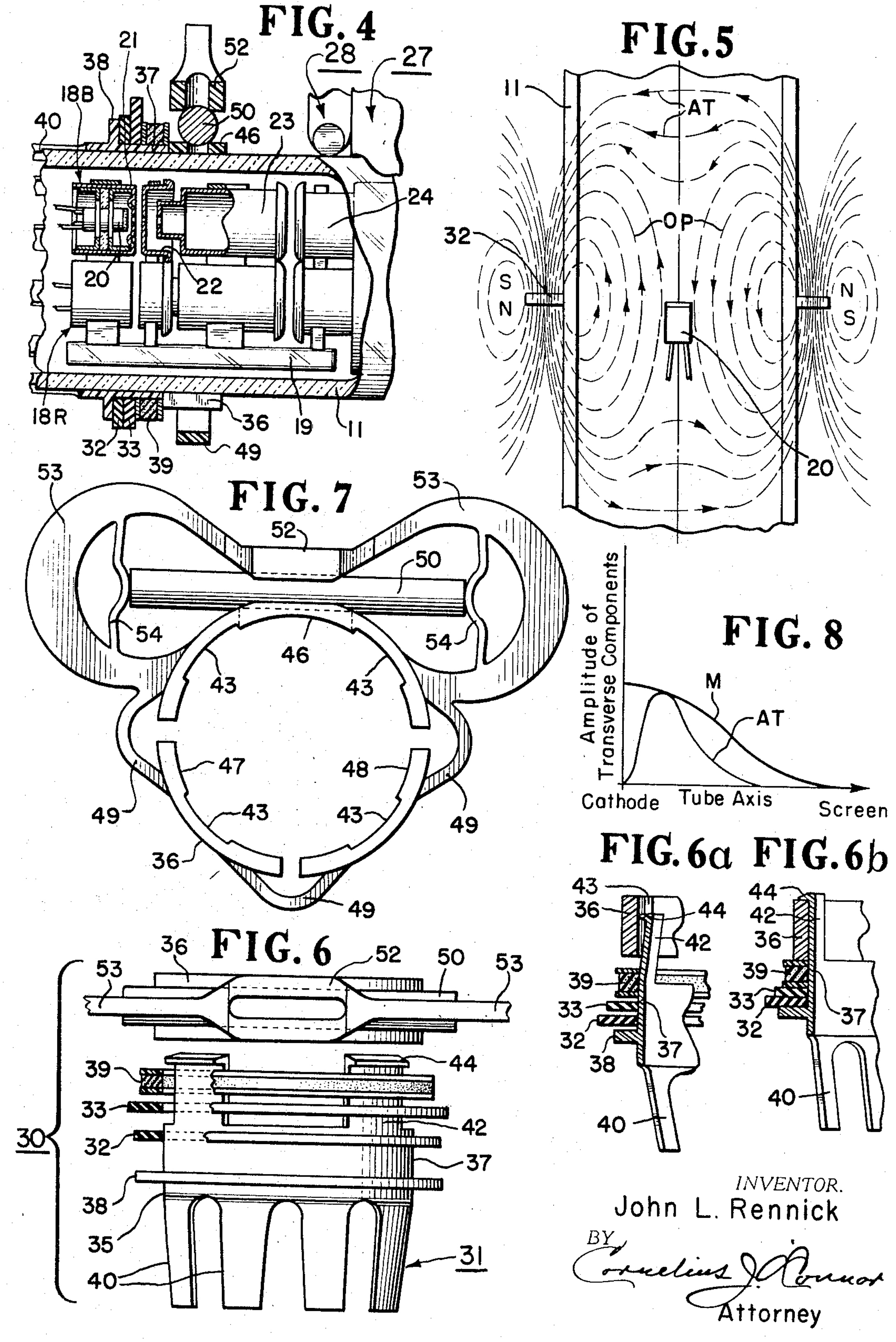

FIGURES 3*a* and 3*b* are plan views of the ring magnets shown in FIGURE 3 illustrating their pole pair distribution;

FIGURE 3*c* is an impression, in profile, of one of the pole pairs shown in FIGURES 3*a* or 3*b*;

FIGURE 4 is a fragmentary sectional view taken along lines 4—4 of FIGURE 3;

FIGURE 5 is a sectional view of a ring magnet taken along lines 5—5 of FIGURE 3*a* including a schematic representation of the composite magnetic field of the magnet;

FIGURE 6 is an exploded view of a purity correction device constructed in accordance with the invention;

FIGURES 6*a* and 6*b* are fragmentary details illustrating the latching arrangement employed in assembling the purity correction device shown in FIGURE 6;

FIGURE 7 is an elevational view of a portion of the purity correction device shown in FIGURE 6; and FIGURE 8 is a comparative plot of the axial distributions of the transverse field components of the inventive purity correction device and those of a prior art type device.

Before proceeding to a description of the invention, the prior art color purity correction magnet M shown in FIGURE 1, together with a portion of its field pattern, will be considered briefly. Magnet M conventionally comprises an annular stamping of a magnetic material which is magnetized across its diameter to establish a magnetic field having transverse components oriented as shown. These prior art correction magnets are rotatably mounted upon the neck of the cathode ray tube in pairs to permit adjusting the strength of the resultant magnetic field, as well as its orientation relative to the beam paths. However, as previously noted and as will be subsequently demonstrated, the field pattern of these prior art type purity correction magnets can occasion a defocusing of the electron beams.

Referring now to FIGURE 2, the color reproducing cathode ray tube 10 there shown is of the type conventionally employed in a color television receiver. Tube 10 comprises a neck section 11 and a funnel or cone portion 12 which is terminated by a display panel 13. Panel 13 supports a target assembly comprising a fluorescent screen 15 composed of a plurality of interspersed similar groups of similar elemental areas disposed on the inside surface of panel 13. Each of these groups comprises a different electron-beam responsive phosphor. Specifically, screen 15 is formed of a group of red phosphor dots, a group of blue phosphor dots and a group of green phosphor dots. These color dots are effectively arranged in groups of three, or triads, each including a red, a green and a blue phosphor dot. An aperture or shadow mask 16 having a multitude of apertures, is fixed in an overlying relation to screen 15 and is so indexed relative thereto as to register an aperture with each color triad.

As best seen in FIGURES 3 and 4, neck section 11 includes means for projecting a plurality of electron beam components from effective points of origin which are symmetrically displaced from the central axis of the tube. More particularly, the neck section contains three electron gun structures 18R, 18G, 18B, only two of which are shown in FIGURE 4, for developing the electron beams R, G and B, respectively. These guns are supported within the neck in a delta array by a plurality of elongated rods 19. To simplify the presentation of the gun structures only blue gun 18B will be detailed, it being understood that guns 18R and 18G are identical to the blue gun. Accordingly, and as best seen in FIGURE 4, in addition to a cathode 20, gun 18B includes a control electrode 21, a first accelerating electrode 22, a focusing electrode 23 and a second accelerating electrode 24, all of which electrodes are preferably formed of a non-magnetic conductive material.

A deflection yoke 26 is mounted upon neck section 11 and in an abutting relation with funnel portion 12 of the tube. Yoke 26 is of conventional construction in that it comprises horizontal and vertical deflection windings which, upon excitation, deflect the electron beams in an ordered fashion to develop a scanning raster.

A radial convergence assembly is also mounted upon the neck of the tube adjacent yoke 26. This assembly comprises a dynamic convergence system 27 and a static convergence system 28 which, collectively, function to maintain convergence of the electron beams during scansion. Insofar as the subject invention is concerned, the form that the convergence assembly may take is of no consequence. A representative prior art dynamic convergence system, for example, is described in Patent 3,141,109 which issued to James F. Chandler. For present purposes it is sufficient to note that dynamic convergence system 27 is a tripartite structure comprising a plurality of coils which, when energized, develop magnetic fields having transverse components which are shunted across the paths of the electron beams to effect controlled radial displacements of the beams relative to the tube axis.

The static convergence system of assembly 28, which also is of a known construction, comprises a series of permanent magnets which are symmetrically positioned about the neck of the tube and normal to the paths of their assigned electron beams. Desirably, assembly 28 takes the form of the static convergence apparatus disclosed in my copending application Serial No. 401,043, which was filed on Oct. 2, 1964, and issued as Patent No. 3,308,328 on Mar. 7, 1967 and is assigned to the same assignee as the subject invention.

In accordance with the invention, a color purity correction device 30 for use with color tube 10 comprises a support element 31 of non-magnetic material which is mounted upon neck section 11 of the tube in juxtaposition to electron gun structures 18B, 18R, and 18G. Means, including a plurality of magnetic pole pairs, are adjustably mounted on support element 31 effectively in a plane which is substantially tangent to the emitting surfaces of cathodes 20, see FIGURE 4. The aforesaid pole pairs are disposed on both sides of neck section 11 and with their magnetic axes substantially parallel to the central axis of the tube. More particularly, the aforementioned means comprises first and second independently adjustable ring members 32, 33 each formed of a magnetizable material and magnetized across its thickness dimension to establish 14 discrete magnetic pole pairs which develop a non-uniform magnetic field. Actually, the number of pole pairs is not critical, a greater or lesser number can be employed so long as specified characteristics of the field are achieved. These characteristics are more fully explained below.

The pole pairs of each ring are circumferentially disposed about the periphery of each of rings 32, 33 with seven pole pairs on one side of a ring and seven on the opposite side, see FIGURES 3*a*, 3*b*. A detail of one such magnetic pole pair is shown in FIGURE 3*c*. This drawing schematically represents a cross-section taken through either of ring members 32, 33. Preferably, ring members 32, 33 comprise a flexible material, such as rubber or neoprene, which is impregnated with ferrite. Except for a difference in their profiles, due to the asymmetrical arrangement of their respective control tabs 32T, 33T, rings 32, 33 are identical. This tab arrangement assures independent adjustment of the ring members since, irrespective of the relative positions of the rings, at least one tab of each ring is always accessible for adjustment.

As seen in FIGURES 3*a* and 3*b*, the pole pairs on one side of each of respective rings 32, 33, the left hand side, for example, are oriented oppositely relative to the pole pairs on the right hand side. Considering ring 32 as typical and referring to the schematic representation of FIG- URE 5, the pole pairs of ring 32 are shown to collectively develop a composite magnetic field having opposing paraxial components OP along the central axis of the tube and aiding transverse components AT at a point forward of cathode 20. There is also, of course, a group of aiding transverse components to the rear of the cathode. It is the forward group of AT components, however, which shunt the beam paths to effect a deflection of the electron beams in a common direction transverse to the central axis of the tube.

Preferably, the magnetic field established by the transverse components is non-uniform, that is to say, a greater degree of field intensity or saturation is desired along a path normal to and across the axis of the neck section than across the periphery thereof. In other words, the saturation at any point in the field varies as a function of that point's perpendicular distance from the polarization axis of the magnet.

A non-uniform field of this type can be achieved by one of several pole pair arrangements. For example, one pole pair arrangement can be established by applying discrete magnetizing forces of different intensities across the thickness of the ring member at equally spaced increments about its periphery, or, by applying constant magnetizing forces at unequally spaced increments. In either case, the desired non-uniformity is achieved by establishing the greatest field saturation in the centermost region of similarly oriented pole pair groups. Moreover, ring magnets 32, 33 are substantially identical so that their respective fields can be made to cancel if little or no purity correction is required.

Referring now to FIGURES 6–7, a more detailed description of support element 31 will be considered. Element 31 is preferably formed of a non-magnetic, resilient, insulating material such as nylon and comprises a sleeve section 35 and a collar 36. Sleeve 35 includes a portion 37 upon which ring magnets 32, 33 are rotatably supported. The ring magnets are captivated upon spindle 37 between an annular flange 38 formed at one end of the bushing and a thrust washer 39, preferably constructed of a yieldable non-magnetic material such as rubber. Thus, when support element 31 is assembled, washer 39 and magnets 32, 33 are subjected to an axial compression sufficient to maintain the magnets in any selected orientation. The sleeve and magnet portion of the assembly are coaxially centered about the neck of the tube by a plurality of inwardly converging fingers 40 extending from one extremity of sleeve 35.

Sleeve 35 is detachably fitted to collar 36 by a series of mounting lugs 42 which project from the other extremity of the sleeve and which are received by a corresponding series of grooves 43 formed in the inner surface of collar 36, see FIGURES 6*a* and 7. As best seen in FIGURES 6*a* and 6*b*, each of lugs 42 is terminated by a tab 44 which engages an end wall of collar 36 to maintain the spindle portion 37 of the sleeve and the collar in an abutting relation. A detachable latching of sleeve 35 with collar 36 is achieved by virtue of the fact that the ends of lugs 42, when sleeve 35 is free of the collar, are biased outwardly to such an extent as to circumscribe a circle having a diameter greater than the inside diameter of collar 36. In this fashion lugs 42, in conjunction with tabs 44, effect a snap fit between sleeve 35 and collar 36.

It is principally collar 36 which serves as the mounting means for the purity correction device 30. To this end, collar 36 comprises an upper section 46, which conforms substantially to the curvature of neck section 11, and two lower sections 47, 48 jointly defining an arc normally having a radius of curvature less than that of the neck section, see FIGURE 7. Three coupling members 49 resiliently connect the upper and lower sections and constitute a biasing means for clamping collar 36 to the neck of the tube at any desired location therealong.

In accordance with a further aspect of the invention, support element 31 performs an additional function, that is, it serves as a support for a blue lateral convergence magnet 50. Magnet 50 is a ferrite bar or rod comprising a plurality of magnets which are established by magnetizing the rod normal to its longitudinal axis. Further details respecting the composition of magnet 50 as well as its mode of operation are found in my copending application Ser. No. 401,043 filed Oct. 2, 1964, now Patent No. 3,308,328. Which application is also assigned to the assignee as the subject invention.

As best seen in FIGURES 4 and 7, blue lateral convergence magnet 50 is positioned directly above blue gun 18B and rotatably captivated thereat between section 46 and a bridging section 52 which interconnects a pair of mounting ears 53 integrally formed with collar 36. In this fashion the magnetic field of magnet 50 is maintained in a fixed spatial relation to the fields of purity magnets 32, 33 as well as to cathodes 20. Extending across each of ears 53 are the resilient bows 54 having inwardly directed ridges which exert axial thrust upon opposite ends of magnet 50. In addition to a support for magnet 50, ear pieces 53 further serve as finger guides for the technician so that an end of the rod may be easily grasped and rotated to establish a desired orientation of the field of magnet 50 relative to the path of the blue beam.

Prior to discussing the manner in which purity correction device 30 functions to achieve color purity, the manner in which the device is assembled will be dealt with briefly. By resorting to the disclosed bi-partite construction for support element 31, ring magnets 32, 33 and axial thrust washer 39 can be assembled without recourse to straps, clips or other fasteners. Specifically, and with the sleeve and collar portions of support element 31 disassembled as shown in FIGURE 6, the two ring magnets 32, 33 and thrust washer 39 are slipped on to the spindle section 37 of the sleeve, preferably in the order shown. Thereafter collar 36 is fitted over mounting lugs 42 with the lugs cooperatively received within grooves 43. The sleeve and collar are axially compressed until tabs 44 snap over the end wall of the collar, see FIGURES 6*a* and 6*b*. While samples of the collar and sleeve made from production tools show that there is no difficulty in holding dimension tolerances on lugs 42 and collar 36 to provide a snap fit, it should be noted that if the collar is under size, or the lugs over size, thrust washer 39 will take up any slack thereby assuring a snap fit.

The blue lateral convergence magnet 50 may then be inserted between mounting ears 53. Actually, it is immaterial whether magnet 50 is mounted upon ears 53 prior to or after the sleeve and collar are assembled. The assembled correction device 30 is then slipped over the neck of the cathode ray tube and moved forward until ring magnets 32, 33 lie in a plane substantially parallel to the emitting surfaces of cathode 20.

Referring now more specifically to FIGURE 8, there is graphically illustrated the manner in which the amplitudes of the transverse field components of prior art magnet M and like components of magnet 32 vary along the tube axis, progressing from the cathode toward the screen. The curve designated M clearly shows that the distribution of the transverse field components of a prior art type magnet along the central axis of the tube is relatively broad. When magnet M is positioned upon the neck of the cathode ray tube, the strongest transverse components of the field influence the beam at or near the cathode, the area in which the beam is relatively "soft" and thus easily influenced. Therefore, in addition to producing a desired radial displacement of the beams, the field also tends to defocus the beam. The transverse field components attributable to magnet 32, on the other hand, exert their influence at a point remote from the cathode. This is probably best understood by referring again to FIGURE 5 wherein it is observed that the transverse field components AT of representative ring magnet 32 peak at a point forward of cathode 20. Accordingly, not only do ring magnets 32, 33 minimize defocusing by exerting their influence forward of the cathode but they are capable of developing a more concentrated magnetic field.

As earlier noted color purity requires that each of electron beams B, R, G, impinge only upon their assigned color dots. There are, of course, other factors which must be considered in order to assure proper color reproduction. Specifically, convergence of the electron beams must first be achieved by apparatus 27, 28. Static convergence is initially undertaken in order to provide an approximate convergence of the beams in the absence of a deflecting field. Actually, and as described in my copending application Ser. No. 401,043, now Patent No. 3,308,328, the red and green beams are initially converged. Thereafter the blue beam is brought as near convergence with the red and green beams as possible with the static convergence system. If static convergence is not satisfactory, as determined by observation of the screen, the blue lateral magnet 50 is rotated in order to displace the blue beam in such a direction as to converge it with the red and green beams.

Thereafter, with static and dynamic convergence established, purity correction is undertaken. From a practical standpoint it is desired to perform purity correction by observing the red beam. Accordingly, the blue and green beams are cut-off and the red beam emphasized. The deflection yoke is then moved back along the neck, as far as space permits, to concentrate the illumination attributable to the red beam in the center of the screen. With the deflection yoke thus displaced, the red beam develops a red blob in the center of the screen. Ring magnets 32, 33 are then rotated to develop a transverse field of such intensity and orientation relative to the beam paths as to provide the most substantial presentation of red upon the screen of the tube. The deflection yoke is then moved forward to its normal position abutting the flange of the picture tube and a readjustment, if necessary, is made with magnets 32, 33.

The above purity correction, it is noted, is performed by observing the effect of the correction magnets along the red beam. Since, in the assembly process, the three beams are fixed, relative to one another, their beams should maintain constant relative spacing. The influence of the correction magnets field upon the red beam is communicated, in like fashion, to the blue and green beams so that blue and green color purity is achieved at the same time that the red beam is corrected.

The advantages inherent in the construction of support element 31 apply equally, of course, in the situation in which it is determined that a prior art type ring magnet can render acceptable results. In such an application the mounting and adjustment procedures for the magnets are similar to those described in respect to magnets 32, 33.

The bi-partite construction of support element 31 not only facilitates assembly of the purity correction magnets but also provides an accurate and fixed spacing of blue lateral magnet 50 relative to the transverse field components of the correction magnets. As clearly demonstrated the simple unified construction of support element 31 not only achieves purity correction and blue lateral convergence but does so with a simple inexpensive construction.

I claim:

1. A color purity correction device for use in conjunction with a color television cathode ray tube of the type comprising a fluorescent screen including a plurality of interspersed similar groups of similar elemental areas, each of which groups of elemental areas comprises a different electron-beam responsive phosphor, and a neck section containing means for projecting a corresponding plurality of electron beam components from effective points of origin symmetrically displaced from a central axis of said tube, said purity correction device comprising:

a support element of non-magnetic material mounted on said neck section of said tube in juxtaposition to said electron beam components projecting means;

and a member comprising a magnetizable material magnetized across a thickness dimension thereof to establish a plurality of magnetic pole pairs, said member adjustably mounted on said support element with said pole pairs disposed on both sides of said neck section and their magnetic axes substantially parallel to said central axis, said pole pairs on one side of said neck section being oriented oppositely to the pole pairs on the other side of said neck section for developing a composite magnetic field having opposing paraxial components at said central axis and aiding transverse field components within said neck section at a point remote from said opposing components to effect deflection of said electron beam components in a common direction transverse to said central axis.

2. A color purity correction device for use in conjunction with a color television cathode ray tube of the type comprising a fluorescent screen including a plurality of interspersed similar groups of similar elemental areas, each of which groups of elemental areas comprises a different electron-beam responsive phosphor, and a neck section containing cathode means and beam forming structure intermediate said cathode means and said fluorescent screen for projecting a corresponding plurality of electron beam components from effective points of origin symmetrically displaced from a central axis of said tube, said purity correction device comprising:

a support element of non-magnetic material mounted on said neck section of said tube in juxtaposition to said electron beam components projecting means;

and means, including a plurality of magnetic pole pairs, adjustably mounted on said support element effectively in a plane substantially tangent to the emitting surface of said cathode means with said pole pairs disposed on both sides of said neck section and with their magnetic axes substantially parallel to said central axis, said pole pairs on one side of said neck section being oriented oppositely to the pole pairs on the other side of said neck section for developing a composite magnetic field having opposing paraxial components at said central axis and aiding transverse field components within said neck section at a point intermediate said cathode means and said screen to effect deflection of said electron beam components in a common direction transverse to said central axis.

3. A color purity correction device for deflecting a plurality of electron beams in a common direction, said device comprising:

a flat ringlike member of magnetizable material magnetized across its thickness dimension to establish two groups of magnetic pole pairs on diametrically opposed sides of said member, said pole pairs of one group being oriented oppositely to the pole pairs of the other group, for developing a composite magnetic field having opposing longitudinal components extending through the plane of said member and normal thereto and having aiding transverse field components establishing a non-uniform magnetic deflection field spaced from and extending substantially parallel to the plane of said member.

4. A color purity correction device for use in conjunction with a color television cathode-ray tube of the type comprising a fluorescent screen including a plurality of interspersed similar groups of similar elemental areas, each of which groups of elemental areas comprises a different electron-beam responsive phosphor, and a neck section containing means for projecting a corresponding plurality of electron-beam components from effective points of origin symmetrically displaced from a central axis of said tube, said purity correction device comprising:

a support element of non-magnetic material mounted on said neck section of said tube in juxtaposition to said electron-beam component projecting means;

and an annular member comprising a magnetizable material magnetized across a thickness dimension thereof to establish a plurality of circumferentially spaced magnetic pole pairs;

means for rotatably mounting said annular member on said support element with said pole pairs disposed on both sides of said neck section and with their magnetic axes substantially parallel to said central axis, said pole pairs on one side of said neck section being oriented oppositely to the pole pairs on the other side of said neck section for developing a composite magnetic field having opposing paraxial components at said central axis and aiding transverse field components within said neck section in a plane axially spaced from said annular member to effect deflection of said electron-beam components in a common direction transverse to said central axis.

5. A color purity correction device for use in conjunction with a color television cathode-ray tube of the type comprising a fluorescent screen including a plurality of interspersed similar groups of similar elemental areas, each of which groups of elemental areas comprises a different electron-beam responsive phosphor, and a neck section containing means for projecting a corresponding plurality of electron-beam components from effective points of origin symmetrically displaced from a central axis of said tube, said purity correction device comprising:

a support element of non-magnetic material mounted on said neck section of said tube in juxtaposition to said electron-beam component projecting means;

and first and second annular members each comprising a magnetizable material magnetized across a thickness dimension thereof to establish a circumferential array of magnetic pole pairs on each of diametrically opposed sides of each said member;

means for independently rotatably mounting said annular members on said support element with the magnetic axes of all said pole pairs disposed substantially parallel to said central axis, said pole pairs on one side of each said member being oriented oppositely to the pole pairs on the other side of said member for developing a composite magnetic field having opposing paraxial components at said central axis and aiding transverse field components within said neck section in a plane spaced from said annular member to effect deflection of said electron-beam components in a common direction transverse to said central axis.

6. A color purity correction device as set forth in claim 2 in which said magnetic pole pair means comprises a member of magnetizable material magnetized across a thickness dimension thereto to establish said magnetic pole pairs and in which said aiding transverse field components of said composite magnetic field developed by said pole pairs establish a non-uniform magnetic deflection field in a plane spaced from and disposed substantially parallel to the plane of said member.

References Cited

UNITED STATES PATENTS

| | | | |
|---|---|---|---|
| 2,722,617 | 11/1955 | Cluwen et al. | 335—302 |
| 2,880,366 | 3/1959 | Armstrong et al. | 313—75 X |
| 2,950,407 | 8/1960 | Barkow et al. | 313—84 X |
| 3,098,942 | 7/1963 | Reiches | 313—77 |
| 3,290,534 | 12/1966 | Kratz | 313—77 |

FOREIGN PATENTS

| | | |
|---|---|---|
| 729,840 | 5/1955 | Great Britain. |

JAMES W. LAWRENCE, *Primary Examiner.*

ROBERT SEGAL, *Examiner.*